Feb. 11, 1930.  R. D. EAGLESFIELD  1,746,697
CONVEYER
Filed June 16, 1928
Fig. 1.
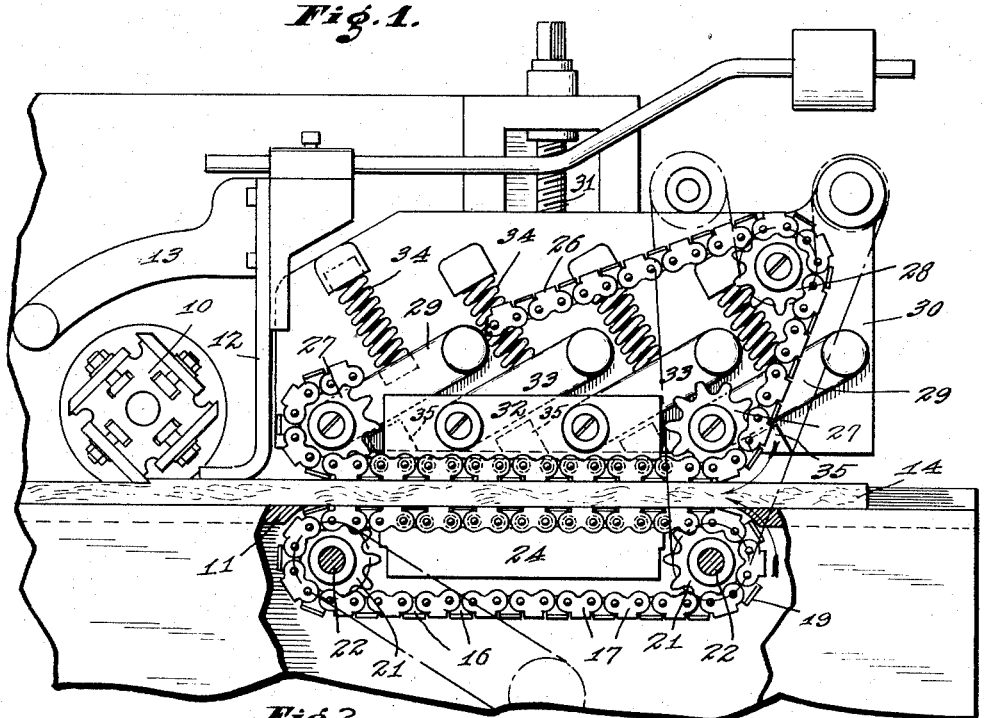
Fig. 2.
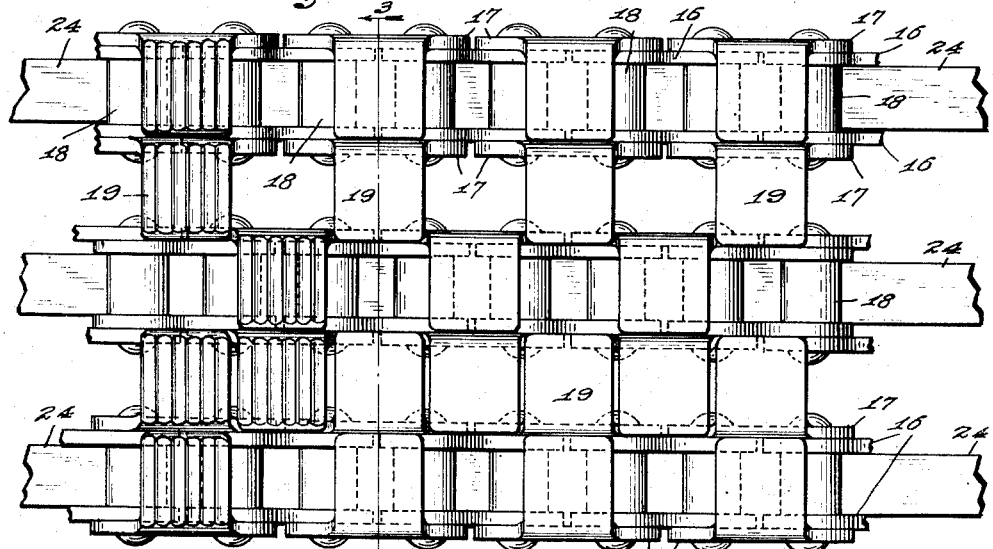
Fig. 3.
Inventor
ROBERT D. EAGLESFIELD, Patented Feb. 11, 1930

1,746,697

UNITED STATES PATENT OFFICE

ROBERT D. EAGLESFIELD, OF BRAZIL, INDIANA, ASSIGNOR TO OLIVER MACHINERY CO., OF GRAND RAPIDS, MICHIGAN, A CORPORATION OF MICHIGAN

CONVEYER

Application filed June 16, 1928. Serial No. 285,909.

It is the object of my invention to produce a conveyer, particularly of a type adapted to be used as a feeding mechanism such as is employed in wood-working for feeding stock to a rotating cutter head. More specifically, it is my object to produce such a conveyer which will operate positively and which will not mar the surface of the material which it conveys.

In carrying out my invention, I form my conveyer of a chain, preferably a chain of the roller type, and I provide side bars of this chain with integral fingers which are bent parallel to each other and parallel to the chain to form a conveying surface. Desirably, I form each conveyer of a plurality of these chains, and I arrange the fingers of one chain in such a manner that they interlace with fingers of the other chain in order to form a more continuous conveying surface. Where the movement of the stock conveyed by my conveyer is opposed by an appreciable resistance, I may provide means for forcing the material against the conveying surface of the conveyer, such means conveniently consisting of a similarly constructed conveyer arranged to be pressed toward the first conveyer.

The accompanying drawing illustrates my invention: Fig. 1 is a fragmental front elevation of a wood-molding machine with parts thereof broken away to show more clearly the construction of my conveyer; Fig. 2 is a fragmental plan view of my conveyer; and Fig. 3 is a section on the line 3—3 of Fig. 2.

In the drawing, my conveyer is shown as embodied in a molder having one or more rotating cutter heads 10 adapted to operate on material fed across the table 11. A shoe 12 may be supported, as by a pivoted weighted arm 13, in position to bear against the top surface of the stock being fed across the table for the purpose of holding such stock against the table. Although my conveyer is shown as being employed for the purpose of feeding strips of wood 14 past the cutter 10 of the molder illustrated, it will be understood that it is not limited to use in such a situation.

As I previously stated, I prefer to form my conveyer from a plurality of endless chains, desirably of the roller type. Each of such chains includes inner side bars 16, outer side bars 17, and the rollers 18. Some of the side bars, desirably opposite outer side bars, are provided with integral fingers 19 which are bent to positions parallel with each other and parallel to the plane of the stretch of the chain.

The conveyer may be built up of any number of chains, depending upon the width of the stock with which it is to be used. As shown in the drawings, three of the chains are provided, each of these chains running over a pair of sprockets 21 carried by shafts 22. One of the shafts 22 is arranged to be driven by any convenient means.

Preferably, although not necessarily, the sprockets 21 on each of the shafts 22 are so spaced, and adjacent chains so arranged on their respective sprockets, that the fingers 19 of one chain overlap the outer side bars of the adjacent chain, as is clear from Fig. 2. Where the load is heaviest on the conveyer, adjacent chains may be so arranged that their fingers 19 extend oppositely, as in the case of the two lower chains shown in Fig. 3, and I am thereby able to obtain between these two chains a substantially continuous conveying surface.

In a conveyer of this kind, I prefer to bend the fingers 19 on any one chain in the same direction, so that the fingers on the side-bars on one side of the chain will extend over the chain while the fingers on the other side bars will extend away from the chain. By arranging the fingers in this manner, I am enabled to make all the chains interchangeable.

To support the stretches of the chains between the sprocket 21, I may provide guide bars 24 on which the rollers of the chains may bear. In situations where, as in the molder illustrated, stock being conveyed by the conveyer has considerable resistance imposed upon it, I may employ a means for forcing the stock against the conveyer. In the device illustrated in the drawings, this means comprises a second conveyer 26 similar to that just described and arranged in such a manner that the stock 14 will be forced forward between parallel stretches of the two conveyers. The conveyer 26 runs over sprockets 27, whose axes are arranged parallel to the axes of the shafts 22, and also over a third or idler sprocket 28. The sprockets 27 are carried by arms 29 which are pivotally mounted on a plate 30 adapted to be vertically adjusted to vary the distance between the two conveyers. As shown in the drawing, an adjusting screw 31 is provided for this purpose.

Guide bars 32 are provided to co-operate with the conveyer 26 to hold the straight stretch of such conveyer in contact with the stock 14. These guide bars are conveniently supported by pivoted arms 33 mounted on the plate 30. Springs 34 acting respectively against the arms 29 and 33 force the sprockets 27 and guide bars 32 downwardly and toward the lower conveyer. Stops 35 limit downward swinging of the arms 29 and 33 when no stock is being fed to the cutter head 10.

The conveyer which I have described and illustrated has several advantages. It may be simply and economically manufactured, as the fingers, which are adapted to form the whole conveying surface, may be integral with and formed as part of the side bars. Further, by forming the fingers integral with the side-bars and by using them as the conveying surface, I am enabled to dispose the conveying surface close to the pitch line of the chain. When my conveyer is used to feed stock to wood-working machines, it has a distinct advantage; for the large effective conveying surface it provides reduces the intensity of pressure on the stock and thereby avoids marring the stock.

I claim as my invention:—

1. In combination, two parallel rotatable shafts, a plurality of chain sprockets on each shaft, chains extending respectively between corresponding sprockets on said two shafts, said chains being of the roller type and having side bars provided with integral fingers bent to positions parallel to each other and to the plane of the reaches of the chain to form a conveying surface, some of the fingers of one chain extending to and overlapping the side bars of the adjacent chain, and supporting means engaging the rollers of each chain between the sprockets associated therewith.

2. In combination, two parallel rotatable shafts, a plurality of chain sprockets on each shaft, chains extending respectively between corresponding sprockets on said two shafts, said chains being of the roller type and having side bars provided with integral fingers bent to positions parallel to each other and to the plane of the reaches of the chain to form a conveying surface, some of the fingers of one chain extending to and overlapping the side bars of the adjacent chain, and a track associated with each of said chains and located between the sprockets over which such chain runs, said track providing a support over which the rollers of such chain may roll.

3. In combination, two parallel rotatable shafts, a plurality of chain sprockets on each shaft, chains extending respectively between corresponding sprockets on said two shafts, said chains having side bars provided with integral fingers bent to positions parallel to each other and to the plane of the reaches of the chain to form a conveying surface, some of the fingers of one chain extending to and overlapping the side bars of the adjacent chain.

4. In combination, two parallel rotatable shafts, a plurality of chain sprockets on each shaft, chains extending respectively between corresponding sprockets on said two shafts, said chains having side bars provided with integral fingers bent to positions parallel to each other and to the plane of the reaches of the chain to form a conveying surface, and supporting means engaging the rollers of each chain between the sprockets associated therewith.

5. In combination, two parallel rotatable shafts, a plurality of chain sprockets on each shaft, and chains extending respectively between corresponding sprockets on said two shafts, said chains having side bars provided with integral fingers bent to positions parallel to each other and to the plane of the reaches of the chain to form a conveying surface.

6. The invention set forth in claim 5 with the addition that the fingers on each chain are all bent to extend in the same direction from the chain side bars with which they are respectively integral.

7. The invention set forth in claim 5 with the addition that the fingers on two adjacent chains are bent in opposite directions with some fingers on one chain extending into spaces between fingers of the adjacent chain.

8. A chain conveyer, comprising a pair of spaced chain sprockets, and a chain extending between said sprockets, said chain having side bars, some of said side bars being provided with fingers disposed parallel to each other and to the plane of the reach of the chain to form a conveying surface, some of said fingers overlying the chain and others extending laterally outward therefrom.

9. A chain conveyer, comprising a pair of spaced chain sprockets, and a chain extending between said sprockets, said chain having side bars, some of said side bars being provided with fingers disposed parallel to each other and to the plane of the reach of the chain to form a conveying surface, the fingers on the side bars on one side of the chain overlying the chain and those on the side bars on the other side of the chain extending laterally outward therefrom.

10. A chain conveyer, comprising a pair of spaced chain sprockets, and a chain extending between said sprockets, said chain having side bars, some of said side bars being provided with fingers disposed parallel to each other and to the plane of the reach of the chain to form a conveying surface, and means for forcing the material conveyed against the faces of said fingers.

11. A chain conveyer, comprising a pair of spaced chain sprockets, a chain extending between said sprockets, said chain being of the roller type and having side bars, some of said side bars being provided with fingers disposed parallel to each other and to the plane of the reach of the chain to form a conveying surface, and a track for supporting said chain between the sprockets, said track being arranged to engage the rollers of the chain.

In witness whereof, I have hereunto set my hand at Brazil, Indiana, this 11th day of June, A. D. one thousand nine hundred and twenty-eight.

ROBERT D. EAGLESFIELD.